United States Patent
Karakama et al.

[11] Patent Number: 5,812,408
[45] Date of Patent: Sep. 22, 1998

[54] CONTROL UNIT AND CONTROL METHOD FOR ROBOT USED FOR ARC WELDING

[75] Inventors: Tatsuo Karakama; Hiromitsu Takahashi, both of Oshino-mura, Japan

[73] Assignee: Fanuc, Ltd., Yamanashi, Japan

[21] Appl. No.: 429,769

[22] Filed: Apr. 27, 1995

[30] Foreign Application Priority Data

May 11, 1994 [JP] Japan .................................. 6-120775

[51] Int. Cl.⁶ .............................. G06F 19/00; G06G 7/64; G06G 7/66
[52] U.S. Cl. ................................ 364/477.06; 364/474.02; 364/551.01; 219/86.7; 219/109
[58] Field of Search ................................ 219/86.24, 86.7, 219/109, 130.01, 125.1; 364/477.06, 477, 551.01, 474.02, 474.04, 188, 189, 190, 191

[56] References Cited

U.S. PATENT DOCUMENTS

| | | | |
|---|---|---|---|
| 4,912,294 | 3/1990 | Tsujii | 219/86.24 |
| 4,973,813 | 11/1990 | Mitchell | 219/109 |
| 5,340,960 | 8/1994 | Takasaki et al. | 219/86.7 |
| 5,353,238 | 10/1994 | Neef et al. | 364/551.01 |
| 5,469,352 | 11/1995 | Yukutomo et al. | 364/192 |
| 5,521,354 | 5/1996 | Ludewig et al. | 219/130.01 |

*Primary Examiner*—Reba I. Elmore
*Assistant Examiner*—Sheela S. Rao
*Attorney, Agent, or Firm*—Staas & Halsey

[57] ABSTRACT

A welding voltage value Vf and a welding current value If are respectively monitored by a detector during execution of arc welding in accordance with a robot operation program, indexes are calculated which show how far the monitored values Vf and If are deviated from a command welding voltage value Vc and a command welding current value Ic specified in the operation program, and it is decided that there is a possibility of occurrence of a defective weld in arc welding under execution, when the calculated index exceeds a preset threshold value. Then, the data for arc-welding execution conditions and execution results are cumulatively stored in a defective weld history data area provided in a memory in accordance with the line number and the statement of the line in the operation program for each line constituting the program, and the cumulatively-stored data is displayed on a screen.

2 Claims, 7 Drawing Sheets

FIG. 2

| COLUMN → | 1 | 2 | 3 | 4 | 5 | 6 | 7 | 8 | 9 |
|---|---|---|---|---|---|---|---|---|---|
| AREA ↓ | PROG | LINE | DATE | TIME | WORK NO | Vv (V) | Ic (A) | Vf (V) | If (A) |
| 01 | ... | .. | .... | ... | .... | ... | ... | .. | ... |
| 02 | ... | .. | .... | ... | .... | ... | ... | .. | ... |
| 03 | ... | .. | .... | ... | .... | ... | ... | .. | ... |
| ... | ... | .. | .... | ... | .... | ... | ... | .. | ... |
| N-3 | WELD A | 017 | 94.04.15 | 14.15 | 013 | 19.0 | 190.0 | 15.8 | 190.1 |
| N-2 | WELD A | 005 | 94.04.15 | 14.09 | 009 | 20.0 | 200.0 | 20.5 | 233.8 |
| N-1 | WELD A | 017 | 94.04.15 | 14.04 | 007 | 19.0 | 190.0 | 15.3 | 189.6 |
| N | WELD A | 005 | 94.04.15 | 14.02 | 007 | 20.0 | 200.0 | 20.2 | 230.3 |

FIG. 3

```
DETECTED DEFECTIVE WELD SETTING /////////////

1  THRESHOLD VALUE (%)                    10.0
2  DETECTION REGISTER NO.                    1
3  DETECTION (CUMULATIVE) REGISTER NO.       2
4  WORKPIECE NUMBER STORING REGISTER NO.     3
5  DETECTION START DELAY TIME (sec)        0.1
```

FIG. 4

```
WELD-A

1 : REGISTER 3 = REGISTER 3+ 1
 2 : EACH AXIS POSITION (1) 100% POSITIONING
 3 : STRAIGHT LINE POSITION (2) 500mm/sec POSITIONING
 4 : ARK START (20.0V, 200.0A)
 5 : STRAIGHT LINE POSITION (3) 100cm/min SMOOTH 100
 6 : STRAIGHT LINE POSITION (4) 100cm/min SMOOTH 100
 7 : ARK START (25.0V, 200.0A)
 8 : STRAIGHT LINE POSITION (5) 100cm/min SMOOTH 100
 9 : STRAIGHT LINE POSITION (6) 100cm/min POSITIONING
10 : ARK END
11 : STRAIGHT LINE POSITION (7) 500mm/sec POSITIONING
12 : ARK START (18.0V, 180.0A)
13 : STRAIGHT LINE POSITION (8) 100cm/min SMOOTH 100
14 : STRAIGHT LINE POSITION (9) 100cm/min SMOOTH 100
15 : ARK START (19.0V, 190.0A)
16 : STRAIGHT LINE POSITION (10) 100cm/min SMOOTH 100
17 : STRAIGHT LINE POSITION (11) 100cm/min POSITIONING
18 : ARK END
19 : EACH AXIS POSITION (12) 100% POSITIONING (END)
```

FIG. 8

| | | | DEFECTIVE WELD HISTORY | | | | | | |
|---|---|---|---|---|---|---|---|---|---|
| | PROG | LINE | DATE | TIME | WORK NO | Vv (V) | Ic (A) | Vf (V) | If (A) |
| 1 | WELD A | 017 | 94.04.15 | 14.15 | 013 | 20.0 | 200.0 | 20.5 | 233.8 |
| 2 | WELD A | 005 | 94.04.15 | 14.09 | 009 | 19.0 | 190.0 | 15.8 | 190.1 |
| 3 | WELD A | 017 | 94.04.15 | 14.04 | 007 | 20.0 | 200.0 | 20.2 | 230.3 |
| 4 | WELD A | 005 | 94.04.15 | 14.02 | 007 | 19.0 | 190.0 | 15.3 | 189.6 |
| 5 | . | . | . | . | . | . | . | . | . |
| 6 | . | . | . | . | . | . | . | . | . |
| . | . | . | . | . | . | . | . | . | . |
| . | . | . | . | . | . | . | . | . | . |
| N | . | . | . | . | . | . | . | . | . |

CUMULATIVE FREQUENCY OF DEFECTIVE WELD OCCURRENCE    4 TIMES

CONTROL UNIT AND CONTROL METHOD FOR ROBOT USED FOR ARC WELDING

BACKGROUND OF THE INVENTION

1. Field of the Invention

This invention relates to a control unit and a control method of a robot, which make it possible to objectively decide whether or not the arc welding executed by a robot is normally performed using output data obtained in the welding and data predetermined for executing the welding.

2. Description of the Related Art

The quality control of products worked with arc welding using a robot has been performed by an operator or a person in charge of inspection who visually checks how weld beads are formed or melted on all machined or sampled workpieces. Because this type of evaluation depending on the human subjective decision requires skill and tends to bring about personal errors, it lacks in objectively as the data for quality control.

Moreover, it is conceivable for the time being to check the quality of welded workpieces by non-destructive inspections such as X-ray fluoroscopy and ultrasonic flow detection. However, large systems and a lot of time are necessary to execute these methods and moreover considerable cost and time are consumed since the inspection is executed for every workpiece every time welding is finished.

Furthermore, since these existing methods have been used to evaluate whether or not welding is normally performed, after the welding is completed, these methods have not been applied to decide whether or not welding is normally performed, during the welding.

As explained before, whether or not welding is normally performed has not been objectively evaluated during the welding by the existing methods, hence it has been difficult for an operator to take a quick action when a defective weld occurs.

Moreover, in the existing methods, various data such as a value outputted from a robot control unit to an arc welding portion and a feedback value inputted from the arc welding portion to the robot control unit have not been cumulatively recorded when a defective weld is detected in accordance with predetermined objective criteria. Therefore, it has been impossible to obtain data to be used as a guideline for improvement or data for assuring the welding quality.

OBJECTS AND SUMMARY OF THE INVENTION

It is an object of the present invention to provide a robot control unit and a robot control method, in which an index enabling to decide whether there is a possibility of the occurrence of defective weld is calculated in accordance with data such as a command value outputted from a control unit of a robot used for arc welding to an arc welding portion (welding power supply portion) and a data such as a feedback value inputted from the arc welding portion to the control unit when welding is executed under control of the control unit, and the welding state is cumulatively recorded in a memory when it is decided according to the index that there is a possibility of the occurrence of defective weld.

The present invention makes it possible to immediately give an alarm to arouse operator's attention when it is decided that there is a possibility of the occurrence of defective weld, and moreover makes it possible to create defective weld history data by cumulatively storing the state of welding being performed at the point of time in a memory in succession.

The present invention is summarized below.

While operating a robot by reproducing a robot operation program, a welding voltage command value Vc and a welding current command value Ic, both of which serve as command values outputted from a robot control unit to an arc welding portion, and moreover, an actual welding voltage Vf and an actual welding current If, both of which serve as feedback values outputted from the arc welding portion to the robot control unit, are monitored respectively.

Then, two types of indexes (hereinafter referred to as a relative voltage deviation and a relative current deviation respectively are calculated in accordance with the above data as shown below.

Relative voltage deviation $\Delta Vr$ is given as:

$$\Delta Vr = |Vc - Vf|/Vc$$

Relative current deviation $\Delta Ir$ is given as:

$$\Delta Ir = |Ic - If|/Ic$$

It is preferable to use both the above indexes to make it possible to decide whether or not there is a possibility of the occurrence of defective weld. However, it may also be decided by using only either of the above indexes.

Criteria by which an occurrence of defective weld can be decided from the calculated indexes are set to the robot control unit. The criteria are set to the control unit generally in the form of a threshold value $\Delta Vrth$ with respect to relative voltage deviation $\Delta Vr$ and a threshold value $\Delta Irth$ with respect to relative current deviation $\Delta Ir$.

That is, the threshold values $\Delta Vrth$ and $\Delta Irth$ are previously set to the control unit, and the relative voltage deviation $\Delta Vr$ and the relative current deviation $\Delta Ir$ are always obtained while welding is executed. Then, it is decided that the welding is not normally performed when either of the above deviations exceeds the threshold value $\Delta Vrth$ or $\Delta Irth$. Moreover, instead of the above way, it is possible to decide whether or not the welding is normally performed by adopting, for example, an orthogonal coordinate system in which $\Delta Vr$ is assigned to x axis and $\Delta Ir$ is assigned to y axis. In this case, when one point ($\Delta Vr, \Delta Ir$) showing relative voltage deviation $\Delta Vr$ and relative current deviation $\Delta Ir$ at each point of time is plotted in the coordinate, it is judged whether the plotted point is included in a normal area or a defective area which has been divided in advance in the coordinate.

In case of these various criteria, particularly, in the former case, it is preferable that a user can select a mode for successively obtaining the relative voltage deviation $\Delta Vr$ and the relative current deviation $\Delta Ir$ and monitoring whether either of the deviations exceeds its corresponding threshold value or a mode for monitoring whether only one of the deviations exceeds its corresponding threshold value without monitoring other indexes. Further, it is preferable that a user can set threshold values (values $\Delta Vrth$ and $\Delta Irth$) which are appropriate by selecting them each time taking account of the operating conditions. Moreover, after executing several statements of blocks (lines) constituting an operation program, it is possible to change the criteria (mode and threshold value) to other criteria for the next block forward.

When it is decided in accordance with the criteria set to the control unit of a robot that the welding now under execution is not normally performed (that is, that a defective weld occurs), the relevant data showing the operation state at the point of time is stored as defective weld history data. The relevant data include the following information.

(a) Data showing the name and line number of a program being executed when a defective weld occurs (b) Data showing the command value and actual value of welding voltage and the command value and actual value of welding current (c) Data for the date and time when a defective weld occurs (d) Data for specifying the work with a defective weld (e) Data showing the cumulative defective weld occurrence frequency It is practical to store the data showing the defective weld occurrence frequency by adding 1 to a register whenever a possibility of the occurrence of defective weld is detected. For notification of a defective weld, it is preferable to use a system for generating a predetermined digital signal when the defective weld occurs and inputting the signal to a register. It is possible to activate warning means such as a buzzer or a red lamp by using the values stored in the register. It is also possible to adopt a system in which a user can specify a register area to be assigned in the register with register numbers.

BRIEF DESCRIPTION OF THE DRAWINGS

The foregoing and other objects and feature of the invention will become apparent from the following description of preferred embodiments of the invention with respect to the accompanying drawings, in which:

FIG. 2 is a table showing the structure of a defective-weld history data area set in a nonvolatile memory of a robot control unit;

FIG. 3 is an illustration showing a screen for setting defective weld detecting conditions as an embodiment;

FIG. 4 is a constitution of a robot operation program which is shown in the form of a statement list;

FIG. 8 is an illustration showing displayed contents of defective-weld history data of an embodiment.

DETAILED DESCRIPTION OF THE PREFERRED EMBODIMENTS

Figure 1:
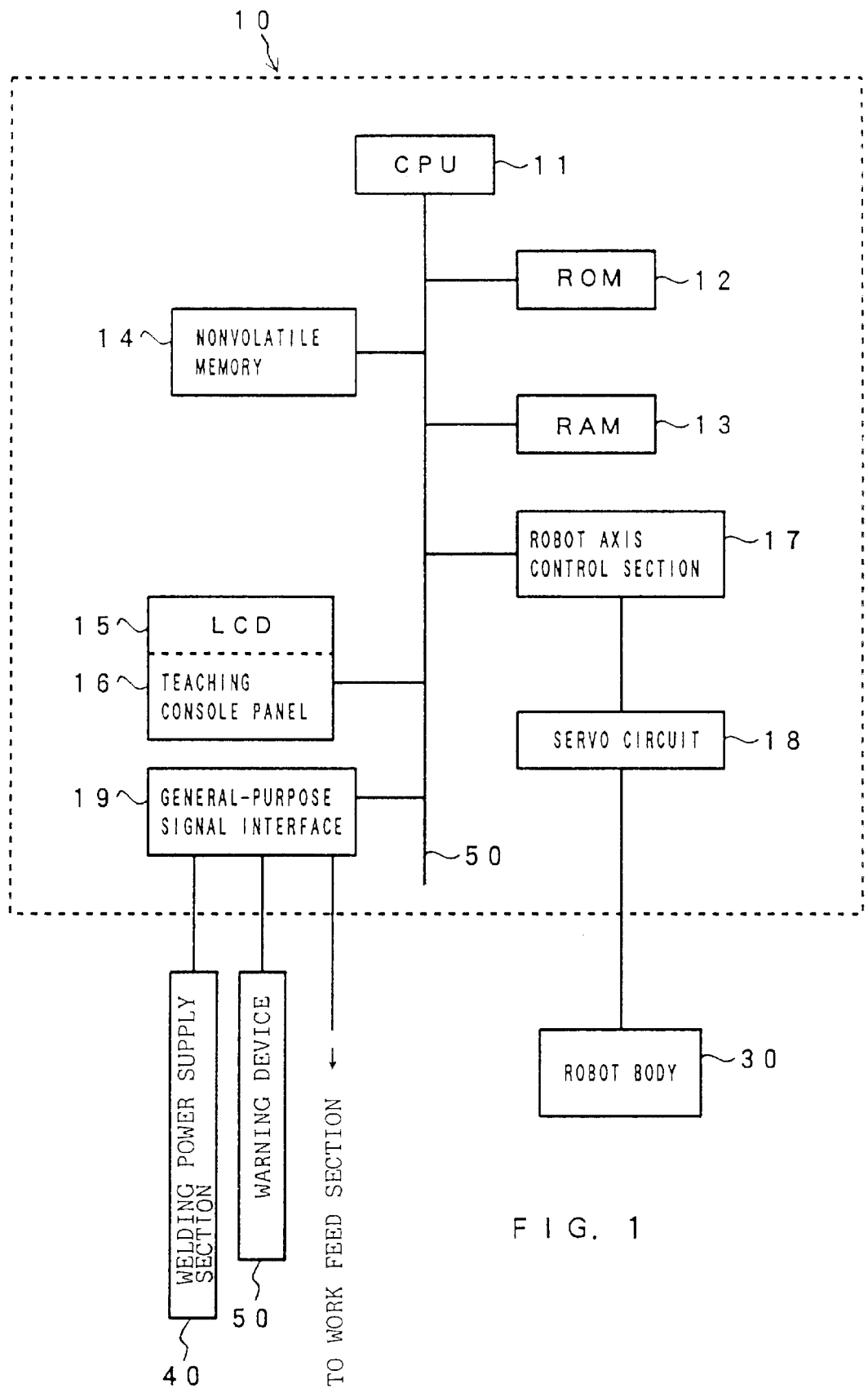
FIG. 1 is a block diagram showing a main portion of the structure of a robot control unit as a first embodiment of the present invention.

FIG. 1 is a block diagram showing a main portion of the structure of a robot control unit as a first embodiment of the present invention.

In FIG. 1, a robot control unit 10 has a central processing unit (hereinafter referred to as CPU) 11. The CPU 11 is connected with a memory 12 composed of a ROM, a memory 13 composed of a RAM, a nonvolatile memory 14 composed of a CMOS device or the like, a teaching console panel 16 provided with an LCD (liquid crystal display) 15, a robot axis control section 17 for controlling each axis of a robot, and a general-purpose signal interface 19, through a bus 20.

The robot axis control section 17 is further connected to a robot body 30 via a servo circuit 18. The general-purpose signal interface 19 is further connected to a welding power supply 40, a warning device 50 (e.g., buzzer or red-lamp flashing device), and a work feed section.

The ROM 12 stores various programs to be executed by the CPU 11 in order to control the whole system. The RAM 13 is a memory used for temporary storage of data or operation thereof. The nonvolatile memory 14 stores an operation program specifying the operation sequences of the robot 30 and the welding power supply section 40 and related set values.

Moreover, a counting register for providing a system clock is set in the nonvolatile memory 14, and clock pulses generated in the CPU 11 are always counted.

The welding power supply section 40 supplies welding voltage and welding current to a welding torch according to commands (that is, a welding voltage command Vc and a welding current command Ic) from the robot control unit 10, and also detects a welding voltage value Vf and a welding current value If actually supplied to the welding torch. The detected values Vf and If are used as feedback values when the power supply section 40 is provided with a feedback control circuit. Therefore, in this embodiment, these detected values Vf and If are referred to as feedback values.

The above structure and functions are not basically different from an existing robot control unit, except in the following points (1) and (2).

(1) To write defective weld history data, a history data area composed of a buffer area group and a buffer counter (counting register area) for specifying a write buffer area are set in the nonvolatile memory 14.

The defective weld history data area of this embodiment is composed of the total of N areas specified with area numbers from 1 to N as shown in FIG. 2. It is assumed that nine columns 1 to 9 are set to each area. These columns store the data values for "executed program name", "line number", "date", "time", "work number", "welding voltage command value Vc", "welding current command value Ic", "detected welding voltage value Vf", and "detected welding current value If" respectively. The initial value of the buffer counter is set to N.

(2) The ROM 12 and the nonvolatile memory 14 store a program for displaying the screen for setting defective weld detecting conditions shown in FIG. 3 on the display screen of the LCD 15 additionally mounted on the teaching console panel 16 in accordance with a command inputted from the teaching console panel 16 and storing the various conditions inputted through the screen in predetermined memory areas of the nonvolatile memory 14 and the relevant set values.

(3) Two types of flags F1 and F2 are set in the RAM 13. The flag F1 of the two flags is initially set to 0, reversed to "1" when an arc start command is outputted, and returned to "0" when an arc end command is outputted. The flag F2 is initially set to 0, reversed to 1 after the lapse of a delay time inputted on the above condition setting screen from the time when the arc start command is outputted, and returned to 0 when the arc end command is outputted.

Figure 5:
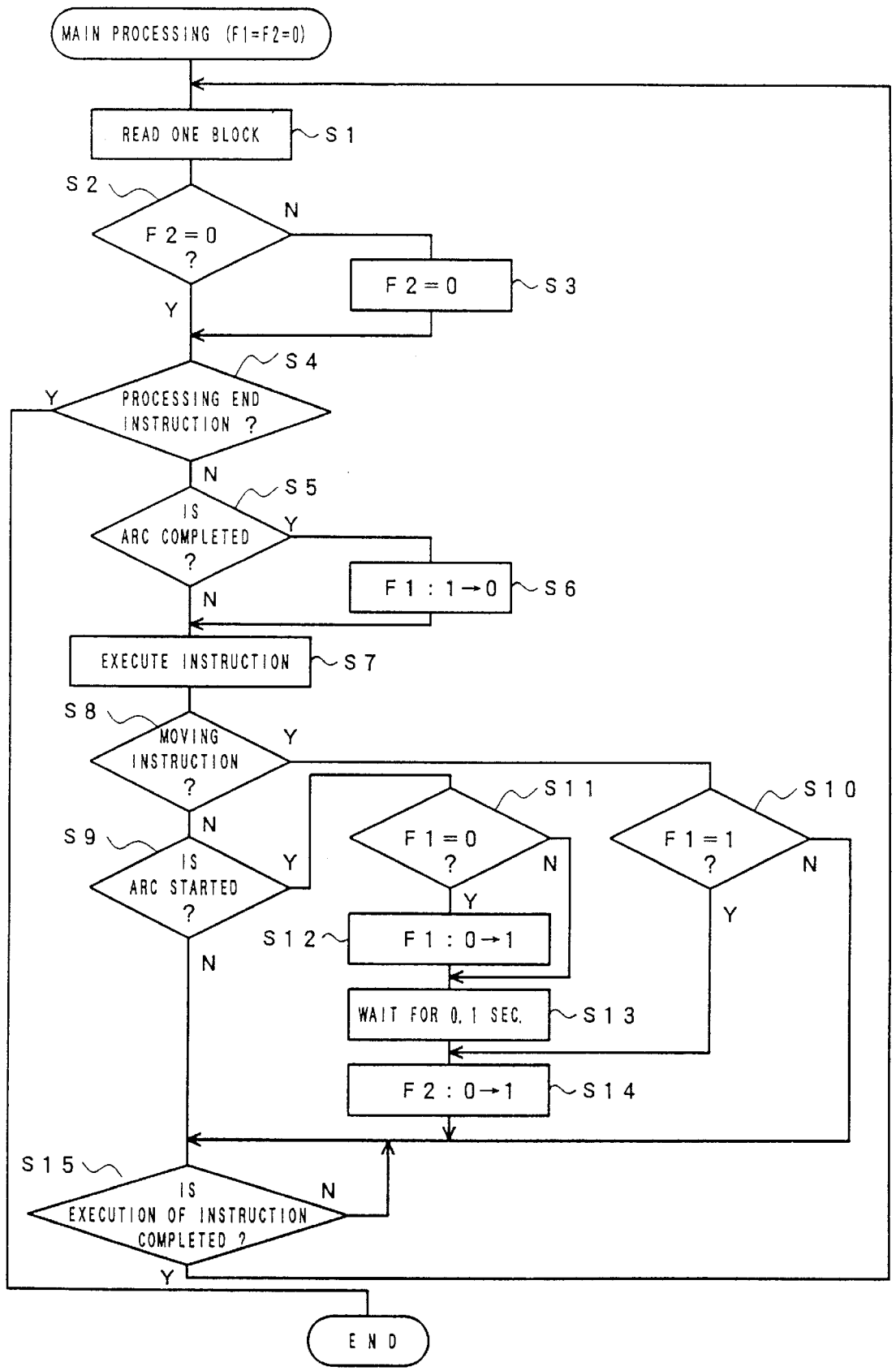
FIG. 5 is a flow chart showing the outline of a main processing of an embodiment.
Figure 6:
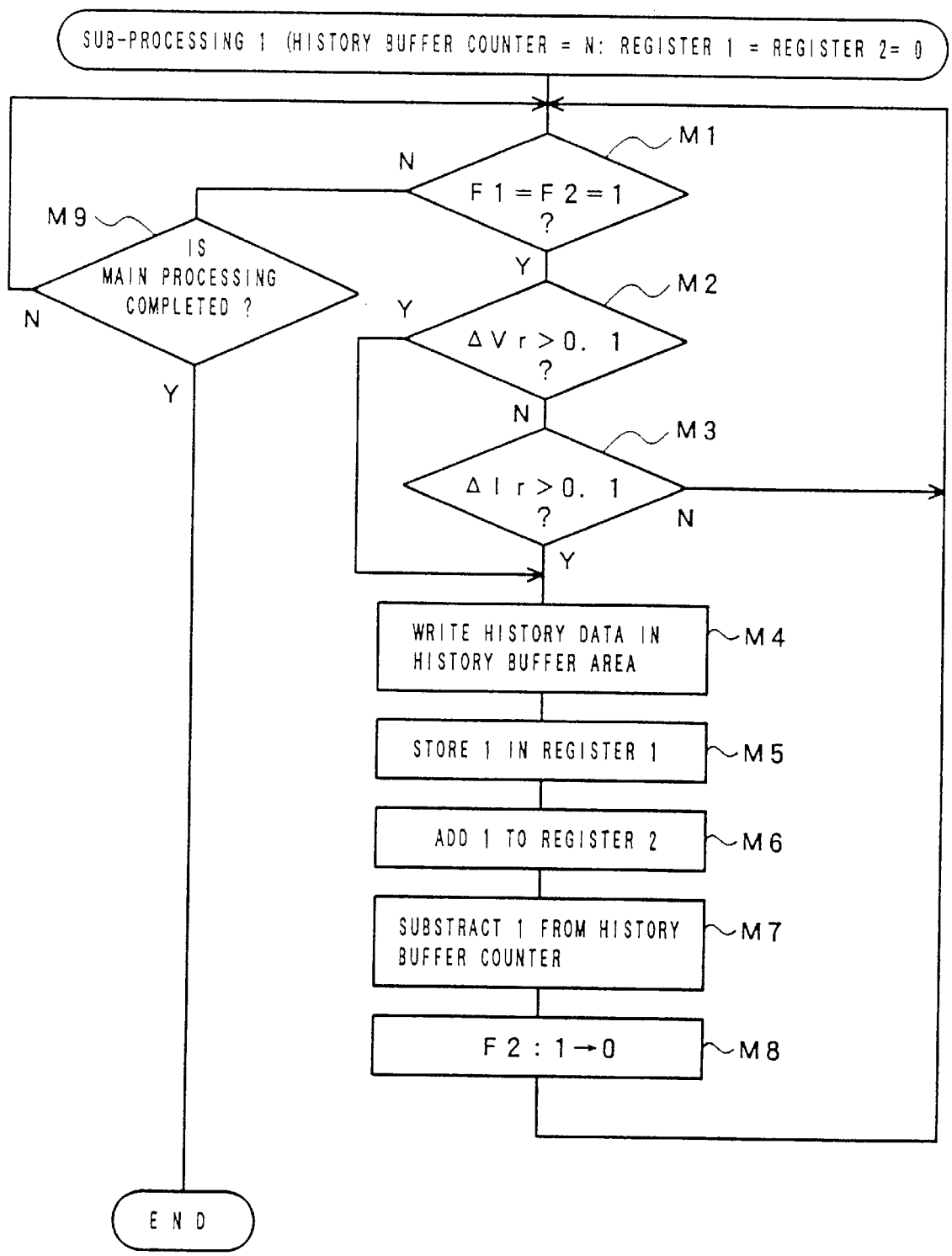
FIG. 6 is a flow chart showing the outline of a sub-processing for storing defective weld history data of an embodiment.
Figure 7:
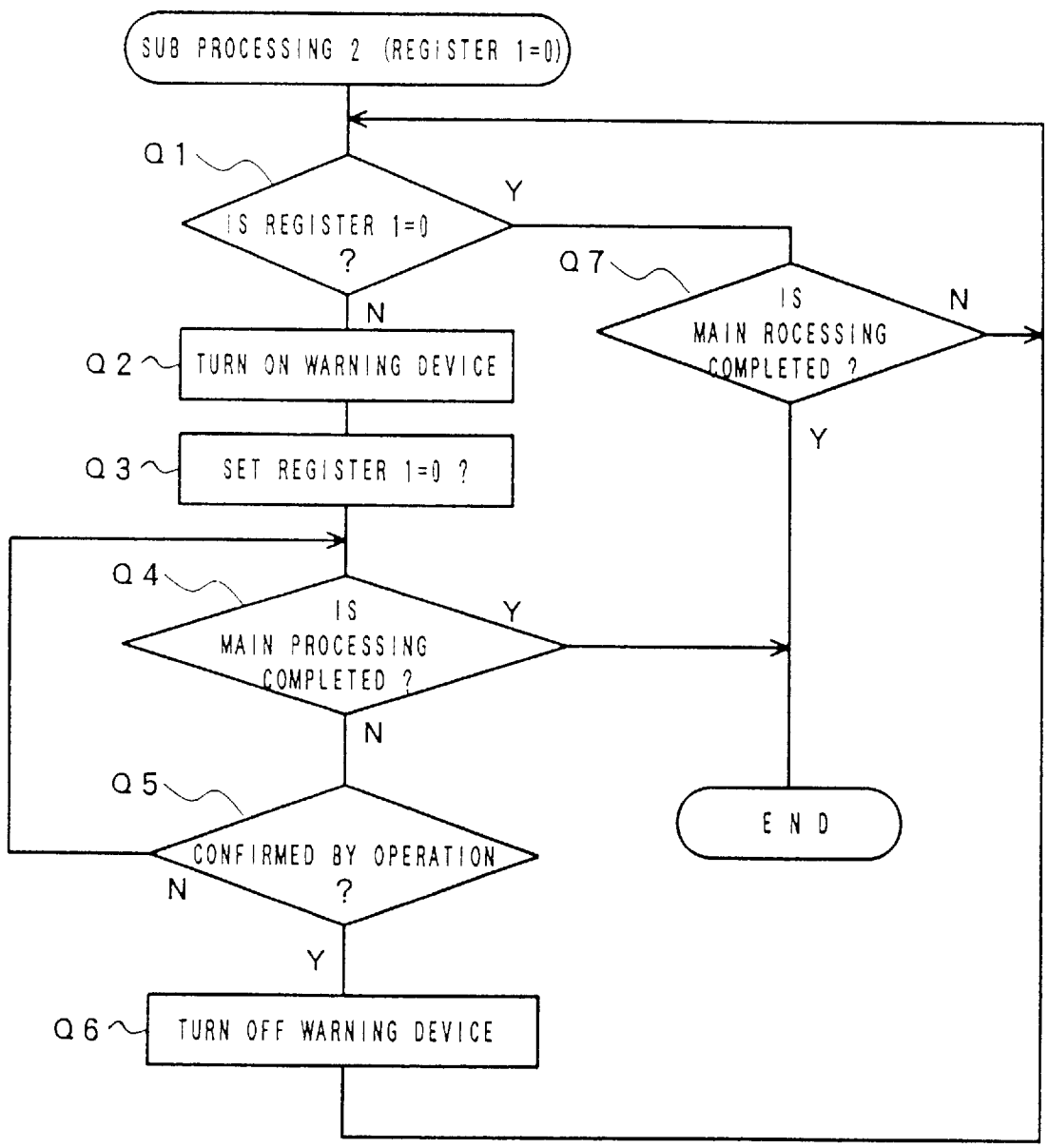
FIG. 7 is a flow chart showing the outline of a sub-processing of an embodiment for operating a warning device.

(4) Various programs for executing various processings shown by the flow charts in FIGS. 5 to 7 and the relevant set values are stored in the ROM 12 or nonvolatile memory 14 in addition to the operation program shown in FIG. 4.

(5) A program for displaying the written defective-weld history on the LCD 15 in the mode to be described later in accordance with a command inputted from the teaching console panel 16 and the relevant set values are stored in the ROM 12 or nonvolatile memory 14.

The outline of the operations and processing procedure of this embodiment will now be described below with reference to FIG. 3.

1. Preparation

First, an operator operates the teaching console panel 16 to call the defective-weld detecting condition setting screen illustrated in FIG. 3 and input the values specified in the lines 1 to 5 using the screen. The input values in the lines 1 to 5 represent as follows.

Line 1: Reference values for deciding whether or not welding is correctly performed based on the calculated indexes (relative voltage deviation ΔVr and relative current deviation ΔIr), that is, the threshold values ΔVrth and ΔIrth are set. When the calculated index exceeds the threshold value ΔVrth or ΔIrth, a "defective-weld detection signal" is generated. In this case, the value is set so that it is decided that a "defective weld" occurs when at least one of the deviations ΔVr and ΔIr exceeds 10%, i.e., 0.1. Incidentally, though the threshold values ΔVrth and ΔIrth are set to the same value (10%) in this case, it is of course possible to set both of these values different from each other.

Line 2: Number of a register for storing a fact that the "defective-weld detection signal" is outputted whenever that signal is outputted. A warning device is controlled whenever the fact is stored in the register.

In this case, the register No. 1 is specified.

Line 3: Number of a register for cumulatively storing a fact that the "defective-weld detection signal" is outputted whenever that signal is outputted. In this case, the register No. 2 is specified.

Line 4: Number of a register for storing a value showing the number of a workpiece under welding. In this case, the register No. 3 is specified.

Line 5: A delay time for delaying the issue of welding-voltage and welding-current detection start commands by a certain time from the issue of the arc start command is set. This prevents a "defective-weld detection signal" from being outputted based on the index which is calculated based on a welding voltage or a welding current in course of a rise while the welding voltage or a welding current is rising at a time immediately after the issue of an ark start command. In this case, the delay time is set to 0.1 sec.

2. Execution of welding

When the above preparation is completed, welding is executed. In this case, the operation program with the contents illustrated in FIG. 4 is reproduced. The outline of the reproduction operation will now be described with reference to FIGS. 5 to 7. In the whole processing, the main processing (FIG. 5) and two sub-processings (FIGS. 6 and 7) are executed in parallel as tasks. First, the outline of the main processing will now be described in accordance with the flow chart in FIG. 5.

In the first processing cycle, the main processing is started with two flags F1 and F2 set to 0. First, the first block of the operation program is read (step S1). The read block (first line) is a statement for adding 1 to the register 3 (register for storing data for the number of a workpiece under operation) in the case of the program in FIG. 4.

After the first block of the program is read, it is decided in the next step S2 whether or not the flag F2 is 0. Since the flag F2 remains in the initial state (F2=0) at present, a process is advanced to step S4 to decide whether or not the block is a processing end instruction. Since the block is not the processing end instruction, a process is advanced to the next step S5 to decide whether or not the block is an arc end instruction.

Since the block is not the arc end instruction, a process is advanced to the next step S7 to execute the instruction of the block read in step S1. That is, 1 is added to the register 3 in step S7.

Then, a process is advanced to the next step S8 to decide whether or not the block read in step S1 is a robot moving instruction. Since the block is not the moving instruction, a process is advanced to the next step S9 to decide whether or not the block is an arc start instruction. Since the block is not the arc start instruction, a process is advanced to step S15 to decide whether or not execution of the instruction in step S7 is already completed. Unless the execution of the instruction is completed, a process is returned to step S1 after the execution of the instruction is completed.

In the second-time processing cycle, the block (second line) for the robot moving instruction under the arc-off state in which arc is not started yet is read (step S1). Since the flag F2 is still kept in the initial state (step S2; Y) and the block read in step S1 relates to neither the processing end instruction (step S4; N) nor the arc end instruction (step S5; N), the content of the block are executed in step S7. That is, movement of the robot is started under the arc-off state.

In this processing cycle, since the contents of the block represent a robot moving instruction, a process shifts from step S8 (decision Y) to step S10. Since the flag F1 is kept in the initial state (F1=0), a process is advanced to step S15 to decide whether or not execution of the contents of the block is already completed. Unless the execution of the contents is completed, a process is returned to step S1 after the execution is completed.

Since the third-time processing cycle is still started with reading of the block (third line) for robot movement before arc is started (step S1), the same processing as that of the second processing cycle is performed.

In the fourth-time processing cycle, the block (fourth line) for an arc start instruction is read (step S1). However, since the flag F2 is still kept in the initial state (F2=0), a process shifts from step S2 to step S4. Moreover, since the block relates to neither the processing end instruction nor the arc end instruction, a process shifts from step S4 to step S7 via S5 and the contents of the read block are executed (step S7). That is, arc is started according to command values Vc=20.0 V and I=200.0 A.

In this processing cycle, since the contents of the block do not relate to robot movement but relate to arc movement, a process shifts from step S8 to step S9, and moreover to step S11. Since the flag F1 is kept in the initial state (F1=0), process shifts from step 11 to Step 12 to change the flag F1 from 0 to 1. Moreover, after the set delay time of 0.1 sec passes (step S13), the flag F2 is changed from 0 to 1 (step S14).

As described above, the fact that the flag F1 is set to 1 represents that supply of welding voltage and welding current to a welding torch is started and moreover, the fact that the flag F2 is set to 1 after the lapse of approximately 0.1 sec from the time when the flag F1 is set to 1 (in order words, the fact that F1 is set to 1 and F2 is set to 1) represents that conditions for starting the monitoring of actual voltage and actual current (feedback values) are arranged. That is, as described later, the above fact represents that conditions for starting the sub-processing 1 shown in FIG. 6 are arranged (step M1; Y).

Then, a process shifts from step S14 to step S15. When it is confirmed that execution of the contents of the block is completed, a process is returned to step S1 again.

In the fifth-time processing cycle, the block (fifth line) for the robot moving instruction after arc is started is read (step S1). It is decided in the next step whether or not the flag F2 is set to 0. However, since the flag F2 is set to 1 in the previous cycle (step S12), the flag F2 is changed from 1 to 0 (step S3). Subsequently, since the contents of the block do not relate to processing end or arc completion, a process shifts from steps S4 and S5 to step S7 to execute the contents of the block. That is, robot movement is started under the arc-on state.

Since the contents of the block relate to the robot moving instruction, a process shifts from step S8 to step S10. Since the flag F1 is set to 1 in step S12 of the previous processing cycle, a process is advanced to step S14 and then the flag F2 is reversed from 0 (F2 was set to 0 in step S3 of this cycle) to 1 to reach step S15. Then, when it is confirmed that execution of the contents of the block is completed, a process is returned to step S1.

Also in the sixth-time processing cycle, processing is executed in the same sequence and robot movement is executed under the arc-on state.

Then, in the seventh-time processing cycle, the block (seventh line) for the arc start instruction is read (step S1). This is a statement for changing the welding voltage or welding current to be supplied to arc. A process is advanced to step S7 via steps S4 and S5 by keeping the flag F2 at 0 or after setting F2 to 0 unless it is not set to 0 (steps S2 and S3). In step S7, the command voltage value Vc and command current value Ic are changed from the contents of the fourth line to those of the seventh line. That is, Vc is changed from 20.0 V to 25.0 V and Ic is changed from 200.0 A to 220.0 A.

Then, a process is advanced to step S11 via steps S8 and S9. Since the flag F1 is kept at 1 since the flag F1 is set to 1 in step S12 of the fourth-time processing cycle, a process is advanced to S13, and after the set delay time of 0.1 sec passes, the flag F2 is reversed from 0 to 1 (step S14).

As described above, even if the conditions for supplying welding voltage and welding current to a welding torch are changed, the conditions for starting the monitoring of feedback values can be arranged after approximately 0.1 sec passes. That is, the sub-processing 1 to be mentioned later shown in FIG. 6 is not executed until approximately 0.1 sec passes (that is, until the conditions of F1=1 and F2=1 are satisfied in step M1) when the conditions for supplying the welding voltage and welding current to the welding torch are changed.

The eighth-time (block of the eighth line) and the ninth-time (block of the ninth line) processing cycles are executed almost similarly to the fifth-time (block of the fifth line) and the sixth-time (block of the sixth line) processing cycles. In this case, the value of the flag F2 is decided for each time in step S2, since a defective weld may be detected by the sub-processing 1 to be mentioned later and thus F2 may be set to 0 in the step M8.

In the tenth-time processing cycle, the block (tenth line) for arc end is read (step Si). Therefore, a process is advanced to steps S2, S3, and S4, and the flag F1 is reversed from 1 to 0 (step S6). Thereafter, arc is completed (step S7). Subsequently, a process is returned to step S1 via steps S8, S9, and S15.

The sub-processing 1 to be executed in parallel with the above main processing is outlined below with reference to the flow chart in FIG. 6.

The sub-processing 1 is started by setting the value of a history buffer counter to N, the value of a warning-device control register 1 to 0, and the value of a defective-weld frequency (accumulated value) recording register 2 to 0.

It is continuously detected by the main processing whether or not both flags F1 and F2 are set to 1 (step M1). That is, as described above, when both flags F1 and F2 are set to 1, the block with the contents of arc start is read and resultingly a process shifts from step S9 (Y) to steps S11 and S12, where the flag F1 is set to 1. Then after 0.1 sec passes, the flag F2 is set to 1 in step S14.

As described above, arc is started and, when 0.1 sec passes, feedback values Vf and If of welding voltage and welding current are detected to calculate the relative voltage deviation ΔVr and relative current deviation ΔIr according to the feedback values Vf and If and the command values Vc and Ic of the welding voltage and welding current for the arc start instruction. That is, the following calculations are performed.

$$\Delta Vr = |Vc - Vf|/Vc$$

$$\Delta Ir = |Ic - If|/Ic$$

Then, it is continuously detected whether or not the relative voltage deviation ΔVr and the relative current deviation ΔIr exceed the preset threshold value 0.1 (steps M1 and M2).

In general, when both welding voltage Vf and welding current If actually detected are close to the command values Vc and Ic, it can be regarded that there is no possibility of the occurrence of defective weld. Therefore, in case of the above embodiment, when the relative voltage deviation ΔVr and the relative current deviation ΔIr are small and do not exceed the set threshold value 0.1, a process is returned to step M1 through the decision in steps M2(N) and M3(N) by assuming that there is no possibility of the occurrence of defective weld. Then, unless the relative voltage deviation ΔVr and relative current deviation ΔIr exceed the threshold value 0.1 until the main processing ends, steps M1, M2, and M3 are repeated. When the arc end command is issued, the flag F1 is set to 0 (F1=0) in step 6 of the main processing. Therefore, a process shifts from step M1 to step M9, since the conditions (F1=1 & F2=1) cannot be satisfied by the decision in step M1 of the sub-processing 1. Unless the main processing is completed under the above state, a process is returned to step Ml. Otherwise, the sub-processing 1 is completed when it is confirmed that the main processing is completed in step M9.

If either of the actually-detected welding voltage Vf and welding current If is greatly deviated from the command value Vc or Ic while the flags are (F1=1 & F2=1), that is, during arc welding or if either of the relative voltage deviation ΔVr or relative current deviation ΔIr exceeds the threshold value 0.1, it is decided that a defective weld occurs and a process is advanced from step M2 or M3 to step M4. Then, necessary history data is written in columns 1 to 9 in the buffer area designated by the history buffer counter (the area in which data is first written is an area corresponding to the initial value N of the history buffer counter as shown in FIG. 2).

In case of the above embodiment, as previously described with reference to FIG. 2, the data values for "execution program name (PROG)", "line number (LINE)", "date (DATE)", "time (TIME)", "work number (WORK NO)", "welding voltage command value (Vc(V))", "welding current command value (Ic(A))", "detected welding voltage vale (Vf(V))", and "detected welding current value (If(A)) are recorded in the defective-weld history data area set in the nonvolatile memory in step M4.

In case of the embodiment in FIG. 2, the lines in AREA N-3 show the written contents when the possibility of the occurrence of defective weld is detected while the contents of the 17th line (LINE: 17) of the operation program WELD A (that is, the program shown in FIG. 4) are executed for the work No. 13 (WORK NO: 13). That is, it is recorded that the possibility of the occurrence of defective weld was detected at 14:15 on Apr. 15 in 1994, the then welding voltage command value Vc was 19.0 V, the then welding current command value Ic was 190.0 A, the then welding voltage feedback value Vf was 15.8, and the then welding current feedback value If was 190.1 A. For this case, the calculated relative voltage deviation ΔVr is approximately 0.17 (>0.1) and the calculated relative current deviation ΔIr is approximately 0. Therefore, though the welding voltage has a large deviation from the common value, the welding current does not have a large deviation.

When write processing is completed in step M4, 1 is stored as a register value in the warning-device control register 1 (step M5), 1 is added to the register value of the accumulated defective-weld frequency recording register 2 (step M6), and moreover only 1 is subtrated from the history buffer counter value (N←N−1; step M7) in order to move the area for writing the next-time defective weld by 1 upward. When the above processing is completed, the flag F2 is reversed from 1 to 0 in step M8. The processing in step M7 is performed to limit the frequency for writing defective well history data to one time during the execution of instructions in the same block (same line) of the same operation program.

Therefore, the next defective weld history data can be written in the defective weld history data area when the flags meet the conditions of (F1=1 & F2=1) again. That is, the above next data can be written in the defective weld history data area when the block for arc start is newly read during the main processing (step S9) and the flag F2 is set to 1 (F2=1) in step S14 through steps S11 and S13.

Hereafter, writing of defective weld history data (step M4), storing of 1 in the warning-device control register 1, and increment of the register value of the defective weld recording register 2 by 1 (steps M5 and M6) are repeated whenever the possibility of the occurrence of defective weld is detected in steps M2 and M3 of the sub-processing 1. On the other hand, the register value of the defective weld recording register 2 is subtracted one by one until an operator clears a counted value. As a result, the area for writing defective weld history data rises one stage by one stage.

When the main processing ends, the flag F1 is set to 0 in step S6 following step S5 and the flag F2 is set to 0 in step S3. Therefore, the conditions (F1=1 & F2=1) cannot be satisfied and thereby a process shifts from step M1 to step M9 to complete the sub-processing 1.

Then, a sub-processing 2 for outputting an alarm when detecting a possibility of the occurrence of defective weld will now be described with reference to FIG. 7.

The sub-processing 2 is started by setting the register 1 to 0. Then, a process shifts from step Q1 to Q7. However, a process is returned to step Q1 unless the main processing is completed. While repeating the cycle, the timing when the register 1 comes to be not equal to 0 is monitored. When a possibility of the occurrence of defective weld is detected in steps M2 and M3 of the sub-processing 1, 1 is stored in the register 1 in step M5. Therefore, the register 1 comes to be not equal to 0. Then, a process is advanced to step Q2, and a warning device 50 such as a red lamp or buzzer (see FIG. 1) is operated to inform an operator that there is a possibility of the occurrence of defective weld.

Then, the register 1 is cleared (register 1=0) to be ready for the main processing to end or an operator's confirmation input (for the operator to depress a confirmation key)(steps Q4 and Q5). When the confirmation input is performed by the operator, the operation of the warning device 50 is stopped (step Q6) and a process is returned to step Q1. The subsequent operations are the same as described above.

When the main processing ends, YES decision is made in step Q4 or Q7 and the sub-processing 2 is competed. In case of the sub-processing 2, once the warning device is operated, the warning device is continuously operated even after the processing ends until the operator depresses the confirmation key. However, it is also possible to automatically turn off the warning device after the red lamp flickers by a certain number of times or the buzzer sounds for a certain time.

It is possible to display the history data recorded during the main processing, sub-processing 1, and sub-processing 2 on the screen of the LCD 15 additionally provided on the teaching console panel 16 (or on other display unit connected to the general-purpose signal interface 19) at all times. It is also possible to display defective weld history data by periodically accessing each defective weld history buffer area and register even during execution of welding. Moreover, it is possible to use a printer as a special form of display of defective weld history data, instead of display units such as an LCD and CRT.

FIG. 8 illustrates display contents corresponding to the recorded contents described in the above cases. An operator or a person concerned can use the data shown in FIG. 8 as criteria of work quality or welding reliability. Further, the data shown in FIG. 8 can be used as reference data for improving the operation program.

As described above, the present invention makes it possible to specify a workpiece in which a defective weld may have occurred and effectively perform additional checking, since the possibility of occurrence of defective weld is detected in accordance with objective criteria and the data related to the detected possibility of occurrence of defective weld is stored.

Moreover, the stored data including the data for program names and instruction lines is also useful as the reference data for improving an operation program and the data for the detected frequency of defective weld occurrence possibility can also be used as an index for quality control when assuming the above data as the frequency for a certain number of workpieces.

Furthermore, as long as a warning device is operated when a defective weld is detected, an operator can take an emergency measure.

What is claimed is:

1. A robot control unit comprising:
   (a) means for storing at least one program for specifying the contents of a welding operation in connection with a robot operation through a welding power supply for controlling a voltage and a current to be supplied to a welding torch supported by the robot;
   (b) means for storing decision conditions related to a possibility of occurrence of a defective weld specified in connection with at least one of the voltage and current to be supplied to said welding torch;
   (c) means for deciding whether or not there is a possibility of occurrence of said defective weld in accordance with said stored decision conditions by monitoring at least one of the voltage and current to be supplied to said welding torch during execution of welding with said welding torch;
   (d) means for storing, as defective weld history data, the data for an operating state at a time of occurrence of said weld when said deciding means decides that the defective weld may occur, said defective weld history data including data representing a command value and real value of a welding voltage and a command value and real value of a welding current, data representing a date, and data for specifying a workpiece with a defective weld; and (f) means for operating a display device to display the stored defective weld history data.

2. A robot control unit according to claim 1, further comprising means for generating a signal for notifying an operator that a defective weld may occur, when the decision indicative of occurrence of a weld defect is made based on the decision conditions stored in said storing means (b).

* * * * *

UNITED STATES PATENT AND TRADEMARK OFFICE
CERTIFICATE OF CORRECTION

PATENT NO. : 5,812,408
DATED : September 22, 1998
INVENTOR(S) : Karakama et al.

It is certified that error appears in the above-identified patent and that said Letters Patent is hereby corrected as shown below:

Title page, item [54]
and col. 1, line 2, "FOR ROBOT" should be --OF ROBOT--.

Col. 2, line 16 [first equation], should be
-- $\Delta Vr = |Vc - Vf|/Vc$ --.

Col. 2, line 19 [second equation], should be
-- $\Delta Ir = |Ic - If|/Ic$ --.

Col. 7, line 51, "Si" should be --S1--.

Signed and Sealed this

Ninth Day of March, 1999

Attest:

Q. TODD DICKINSON

Attesting Officer

Acting Commissioner of Patents and Trademarks